UNITED STATES PATENT OFFICE.

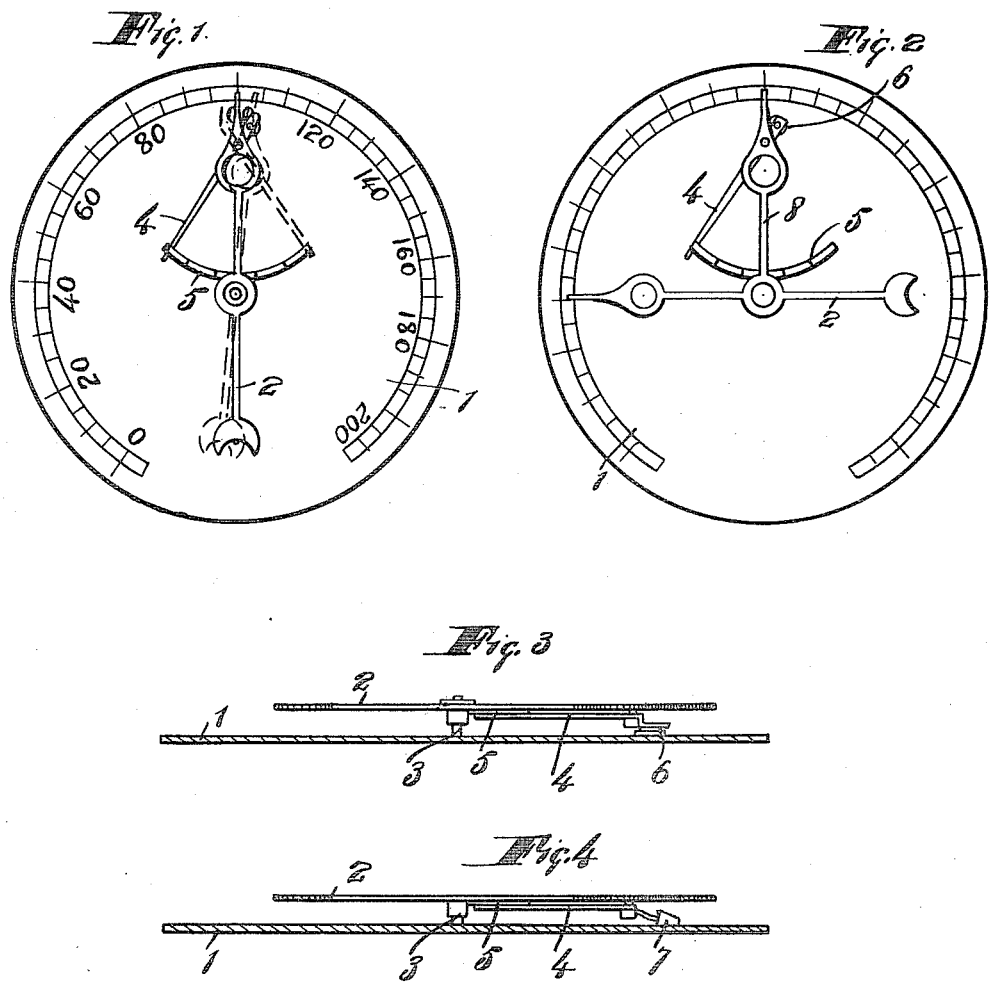

ROBERT E. FIELDS, OF FORT WORTH, TEXAS.

INDICATOR FOR PRESSURE-GAGES.

964,634.

Specification of Letters Patent. Patented July 19, 1910.

Application filed January 16, 1909. Serial No. 472,641.

*To all whom it may concern:*

Be it known that I, ROBERT E. FIELDS, a citizen of the United States, residing at Fort Worth, in the county of Tarrant and State of Texas, have invented certain new and useful Improvements in Indicators for Pressure-Gages, of which the following is a specification.

This invention relates to pressure gages and more particularly to means for making the gages indicate in a more striking manner the change taking place in the pressure and whether the pressure is decreasing or increasing, and the object is to provide the indicators of gages with auxiliary indicators by which the space traversed by a main indicator is multiplied by the auxiliary indicator so that a slight movement of the main indicator will cause a much larger movement of the auxiliary indicator.

With the gages in use, the indicator must traverse practically a space which indicates a change of five pounds of pressure before it will be ordinarily observed and the observer has to charge his memory with the reading previously made. By the time a decrease of five pounds of pressure is noted, a considerable headway is gained and still more pressure will be lost because the fireman must put in fresh coal or fuel and this will require to be ignited before it will produce heat and the fresh fuel will cause loss of heat for a few minutes. The effect of such changes on the steam boilers is enormous. The contraction and expansion due to the fall and rise of pressure caused by variations in heat ruin boilers and break stay-bolts. The disadvantage of the indicators in use is that they do not sufficiently warn the firemen and engineers of the enormous effect of losing as much as five pounds of pressure. It is desirable to show in a more striking manner the changes taking place. The engineer or the fireman should know instantly when the pressure commences to change.

The object of this invention is to remedy the defects of the gages in use.

Other objects and advantages will be fully explained in the following description and the invention will be more particularly pointed out in the claims.

Reference is had to the accompanying drawings which form a part of this application and specification.

Figure 1 is a face of an ordinary pressure gage with the auxiliary indicator and an arc attached to the indicator of the gage. Fig. 2 is a similar view of a gage, showing a variation of the manner of mounting the auxiliary indicator. Fig. 3 is a side elevation of the indicators shown in Fig. 1. Fig. 4 is a similar view to Fig. 3, but showing a variation in the construction of the friction device of the auxiliary indicator.

Similar characters of reference are used to indicate the same parts throughout the several views.

The dial of an ordinary pressure gage is shown in the drawings. The dial plate 1 is provided with the usual degree scale and an indicator 2 mounted on an arbor 3. An auxiliary indicator 4 is pivotally connected to the indicator 2, preferably on the underside thereof. An arc 5 is also attached to the underside of the indicator 2. This arc is suitably marked with lines into spaces over which the point of the indicator 4 moves in operation. One end of the indicator 4 has a friction pad 6 attached thereto to move on the face of the dial plate 1.

The construction of the device which bears against the face of the plate 1 may be varied. Fig. 4 shows the friction device in the form of a cone-shaped roller 7. It is not necessary that the auxiliary indicator should be mounted on the main indicator 2, as the auxiliary indicator may be mounted on an arm 8 which is rigid with the indicator 2, as shown in Fig. 2. The friction bearing 6 or 7 will control the movement of the point of the indicator 4. When the main indicator moves the friction bearing will trail behind the main indicator 2. The arc 5 may be made any suitable size and the pointer of the auxiliary indicator 4 may be of any suitable length. The drawings show the gage provided with spaces which indicate five pounds of pressure and the arc 5 shows five spaces, each of which spaces is equal to a five pound space on the gage dial so that the space on the arc is multiplied five times, or to state the matter in different words, while pointer of the main indicator moves one quarter of an inch space on the gage dial scale, the pointer 4 of the auxiliary indicator will move five quarter inch spaces on the arc 5.

The pointer 4 is intended to move only over the arc 5. When the pressure is rising the hand or indicator 2 turns in the direction of a clock hand. When the pressure is falling the indicator 2 moves in the opposite direction to that of a clock hand. When the pressure is rising the auxiliary indicator 4 will move in front of the indicator 2 and the friction pad 6 will trail behind the indicator 2. As a matter of fact, the friction pad 6 will ordinarily move very little since the variation of the pressure is not ordinarily more than ten or fifteen pounds and not often that much. With a variation of five pounds the movement of the pad, if perceptible at all, will be very slight. The auxiliary indicator serves to show whether the pressure is rising or falling. When the pressure is falling the indicator 2 moves in a direction opposite to that of a clock hand and the indicator 4 will move in front of indicator 2 and the pad 6 will trail behind the indicator 2. The pad 6 acts somewhat as a pivot.

In Fig. 1 of the drawing the full lines indicate the position of the auxiliary indicator at starting and the dotted lines indicate the position of the auxiliary indicator relative to the main indicator and the arc 5 after the auxiliary indicator has reached its limit. The position of the auxiliary indicator may be changed by connecting the same with the main indicator near the arbor of the main indicator and placing the arc toward the end of the main indicator. The pivotal connection of the auxiliary indicator with the main indicator may be varied. The bearing surface of the auxiliary indicator against the face of the dial plate may consist of any material or device which will effect the turning of the auxiliary indicator when the main indicator moves.

The proportion of the spaces of the arc 5 to the spaces of the main dial may be increased or decreased. The main indicator carries the auxiliary indicator and as the main indicator moves the friction bearing of the auxiliary indicator presses against the face of the dial plate. This will cause the pointer of the auxiliary indicator to move over the arc 5. In this manner the slightest change of pressure can be seen at a glance by a fireman or engineer or other operator, and the observer will know by the position of the auxiliary indicator on one side or the other of the main indicator whether the pressure is increasing or decreasing.

Having fully described my invention, what I claim as new and desire to secure by Letters Patent, is,—

1. In a pressure gage provided with a dial and a main indicator moving about said dial; an auxiliary indicator pivotally connected to and coöperating with said main indicator, an arc attached to said main indicator, and means for causing said auxiliary indicator to move relative to said arc.

2. In a pressure gage provided with a dial and a main indicator; an auxiliary indicator pivotally connected to and coöperating with said main indicator, a graduated arc attached to said main indicator, and means contacting with said dial and carried by said auxiliary indicator for causing the same to move relative to said arc.

3. In a pressure gage provided with a dial and a main indicator; an arc attached to said indicator and carried thereby and an auxiliary indicator pivotally connected with said main indicator and coöperating with said arc and having a friction bearing adapted to contact with said dial.

4. In a pressure gage provided with a dial and a main indicator; an auxiliary indicator pivotally connected to said main indicator, an arc coöperating with said auxiliary indicator to show an increased number of spaces as compared with the spaces indicated by said main indicator, and means coöperating with said main indicator to cause the movement of the auxiliary indicator relative to said arc.

5. In a pressure gage provided with a dial and a main indicator; an auxiliary indicator actuated by said main indicator, an arc moving with said main indicator and coöperating with said auxiliary indicator to show an increased number of spaces as compared with the spaces indicated by said main indicator, and means coöperating with said main indicator to cause the movement of said auxiliary indicator relative to said arc.

6. In a pressure gage provided with a dial and a main indicator moving about said dial, an arc moving with said main indicator, and an auxiliary indicator actuated by said main indicator and coöperating with said moving arc.

In testimony whereof, I set my hand in the presence of two witnesses, this 6th day of January, 1909.

ROBERT E. FIELDS.

Witnesses:
A. L. JACKSON,
J. W. STITT.